No. 677,214. Patented June 25, 1901.
H. HOLLERITH.
TABULATING APPARATUS.
(Application filed July 17, 1900.)
(No Model.) 10 Sheets—Sheet 2.
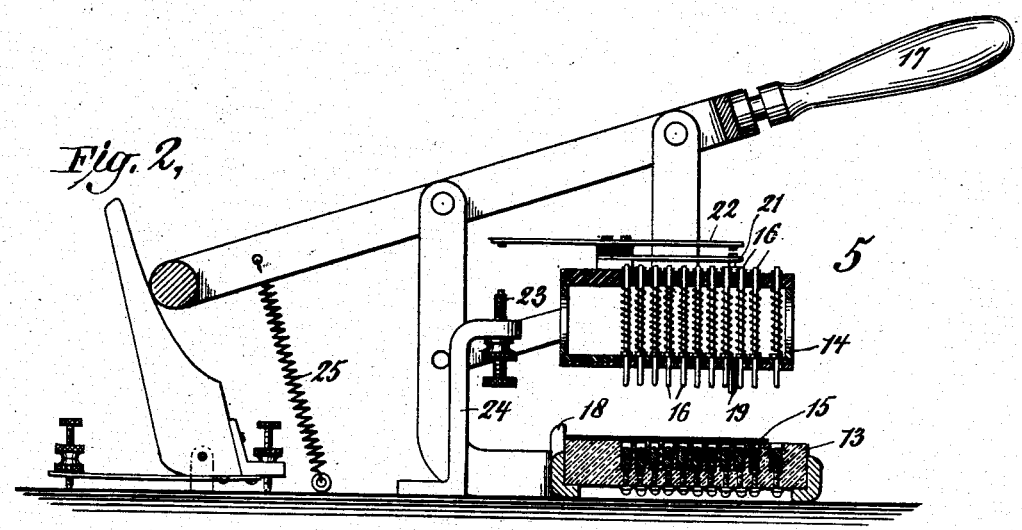
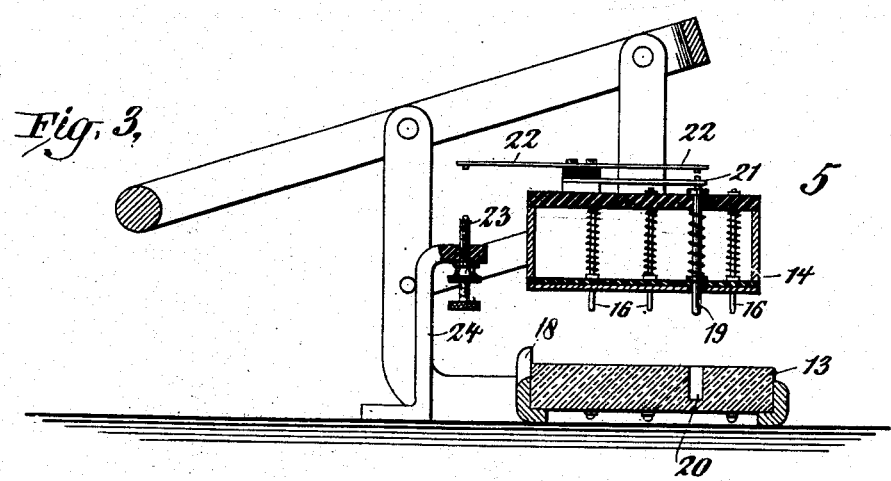
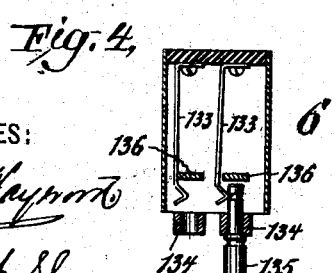
WITNESSES:
INVENTOR
Herman Hollerith
BY
ATTORNEYS No. 677,214. Patented June 25, 1901.
H. HOLLERITH.
TABULATING APPARATUS.
(Application filed July 17, 1900.)
(No Model.) 10 Sheets—Sheet 3.
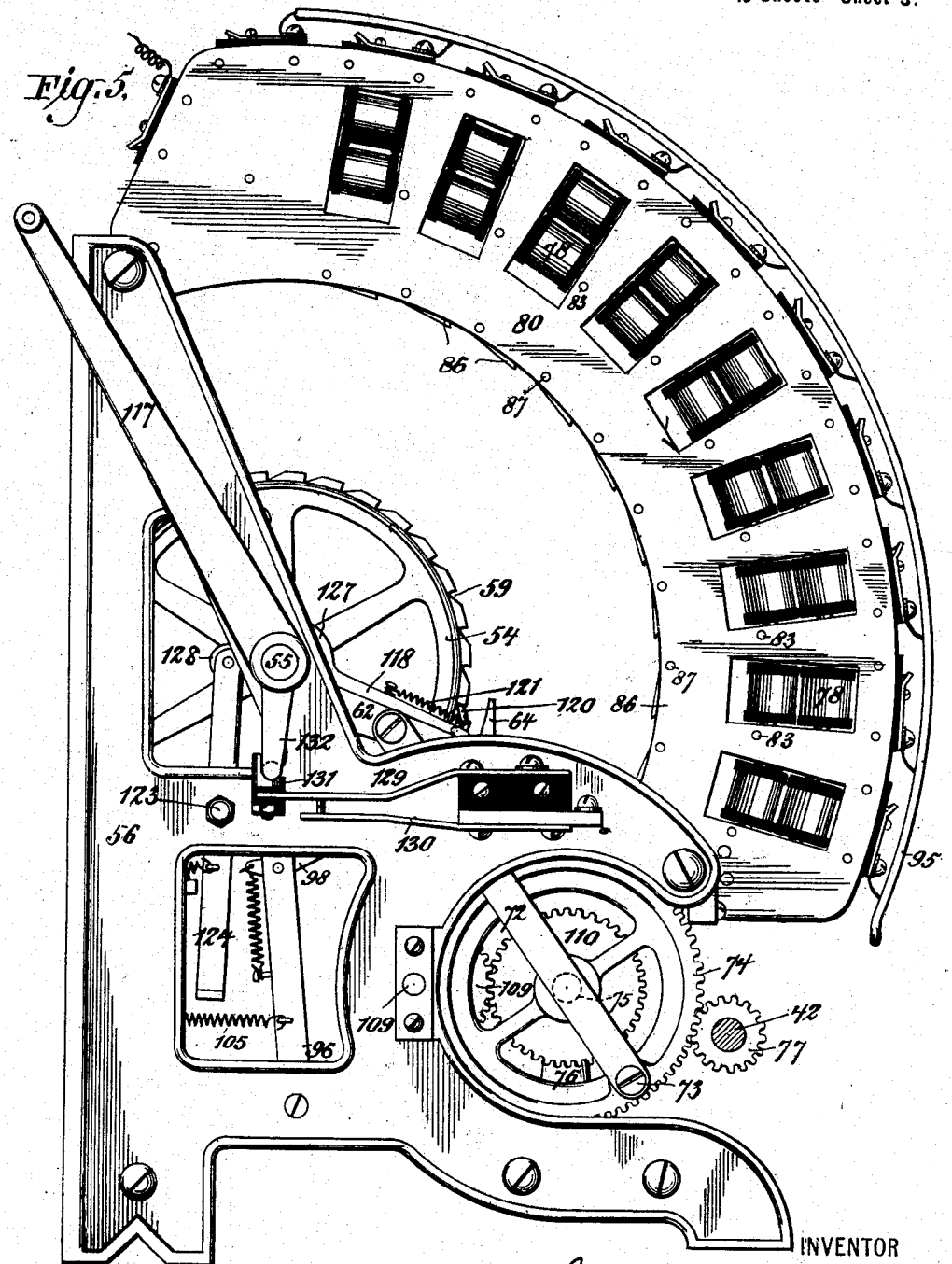

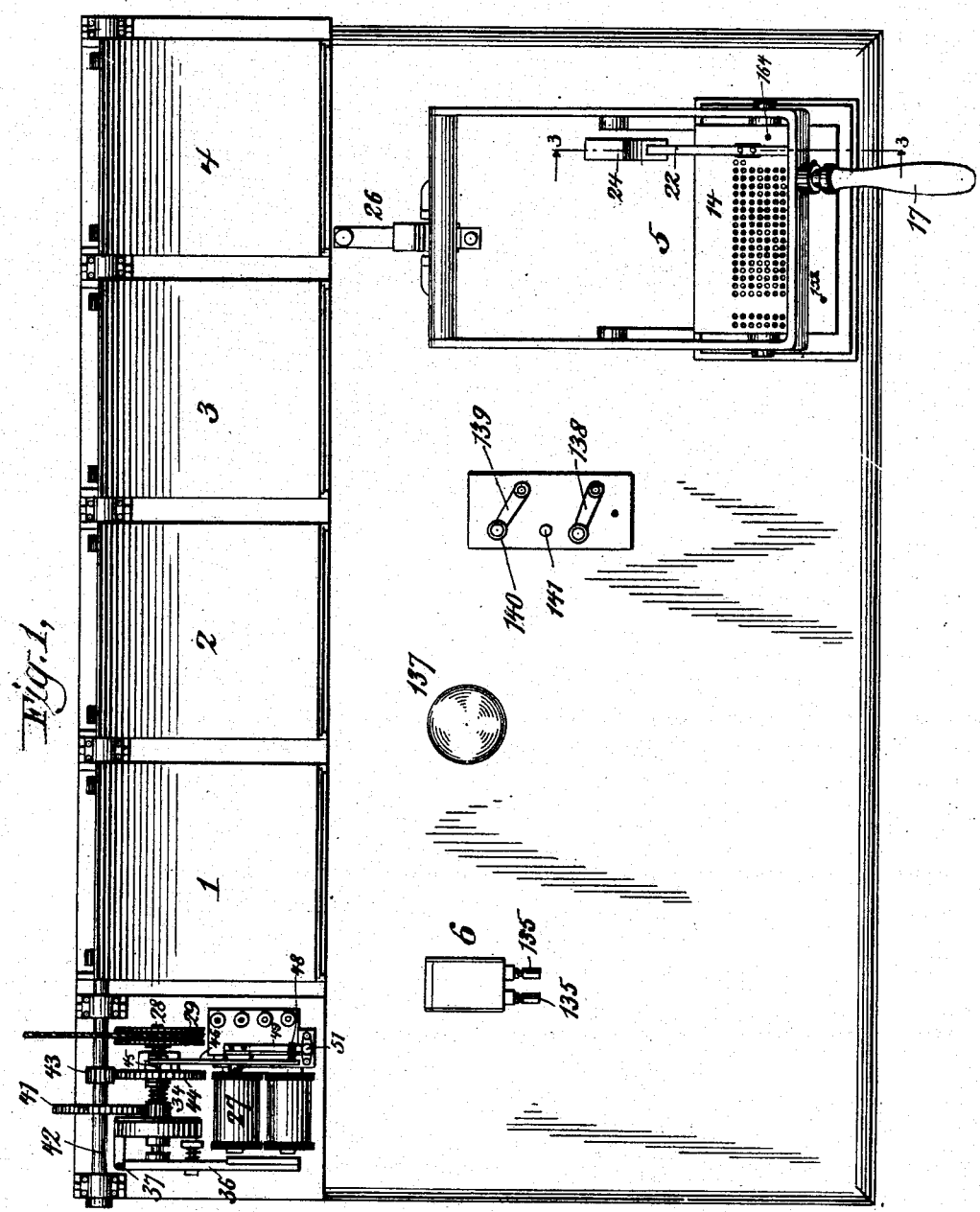

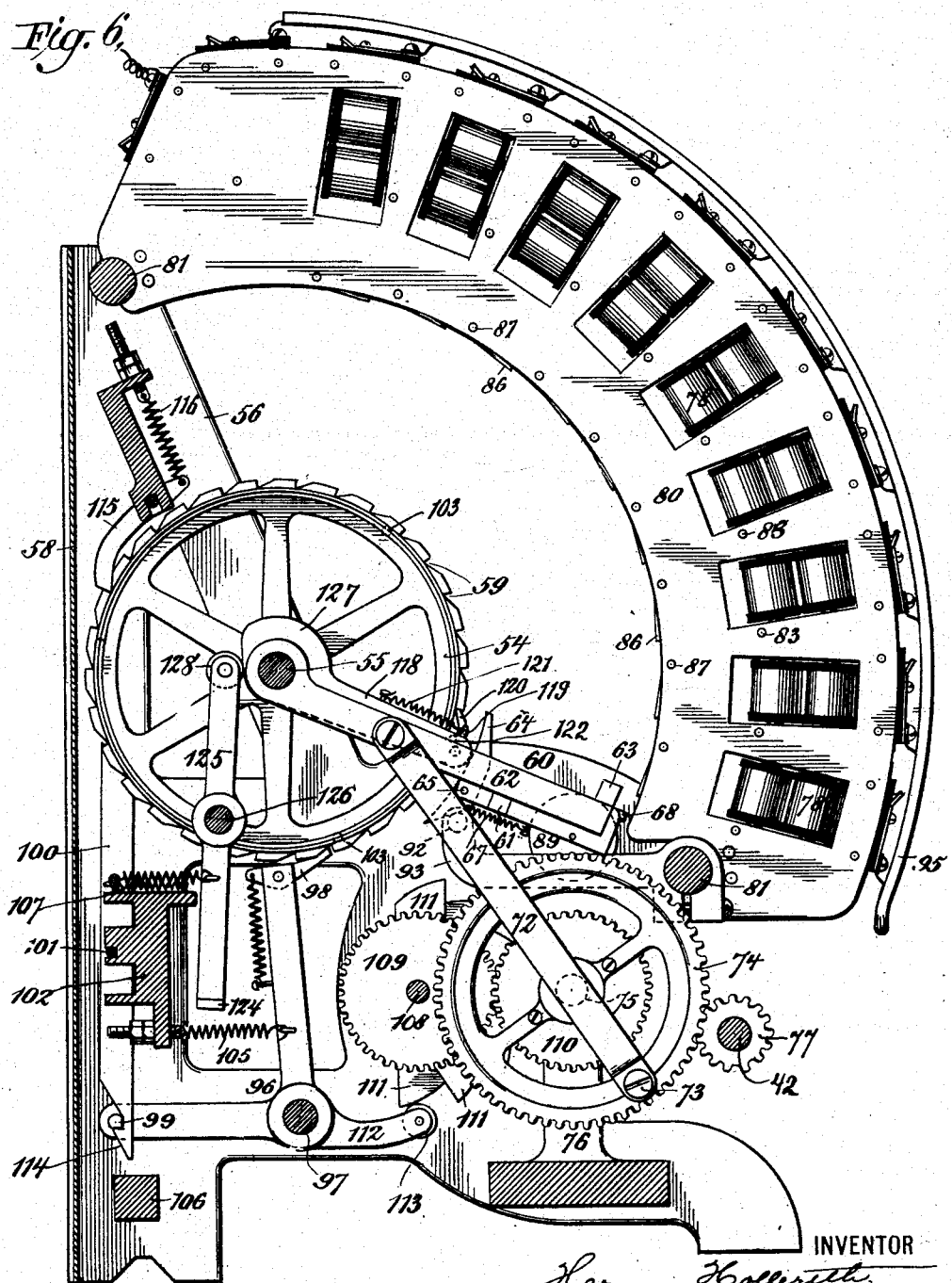

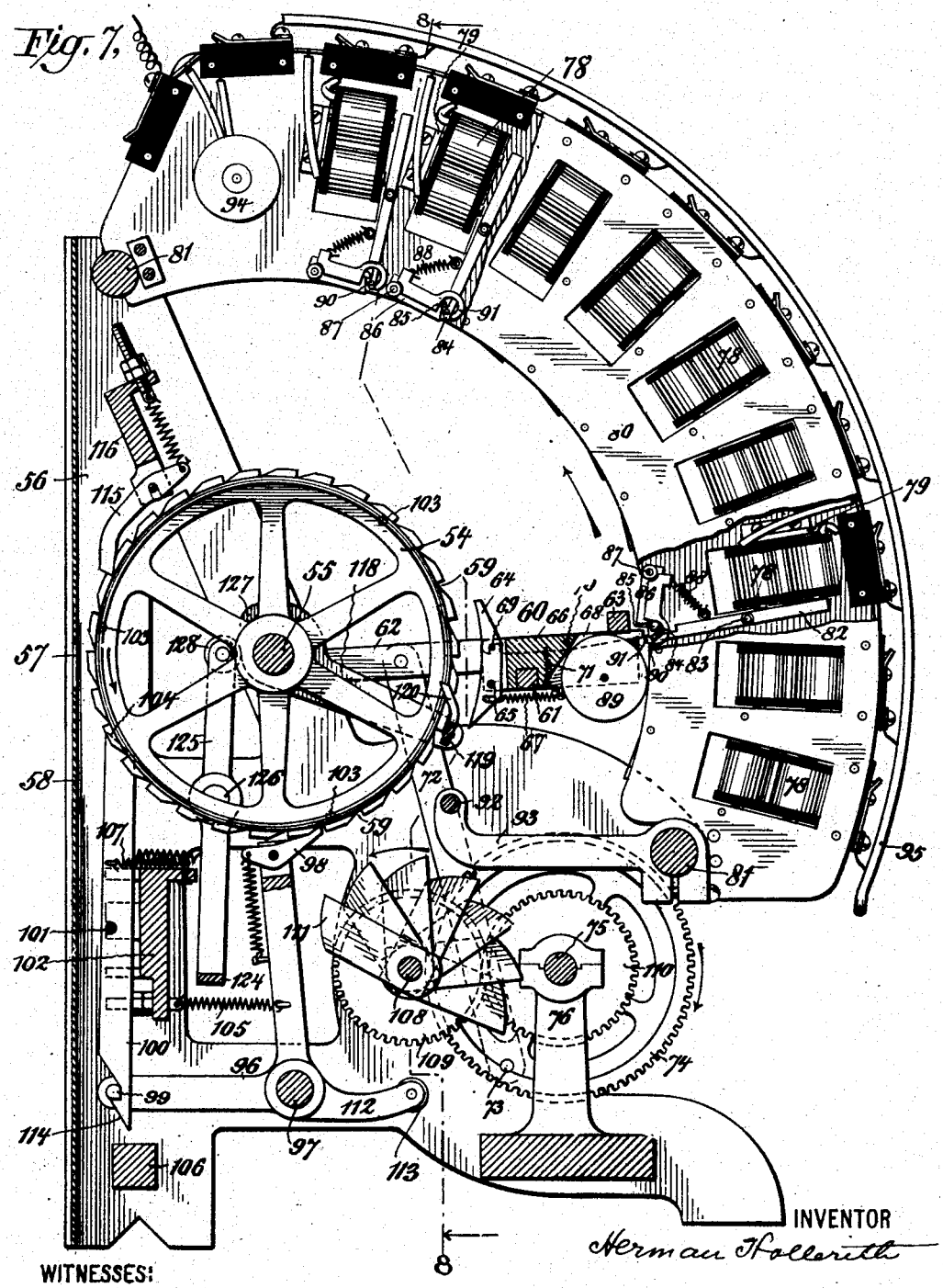

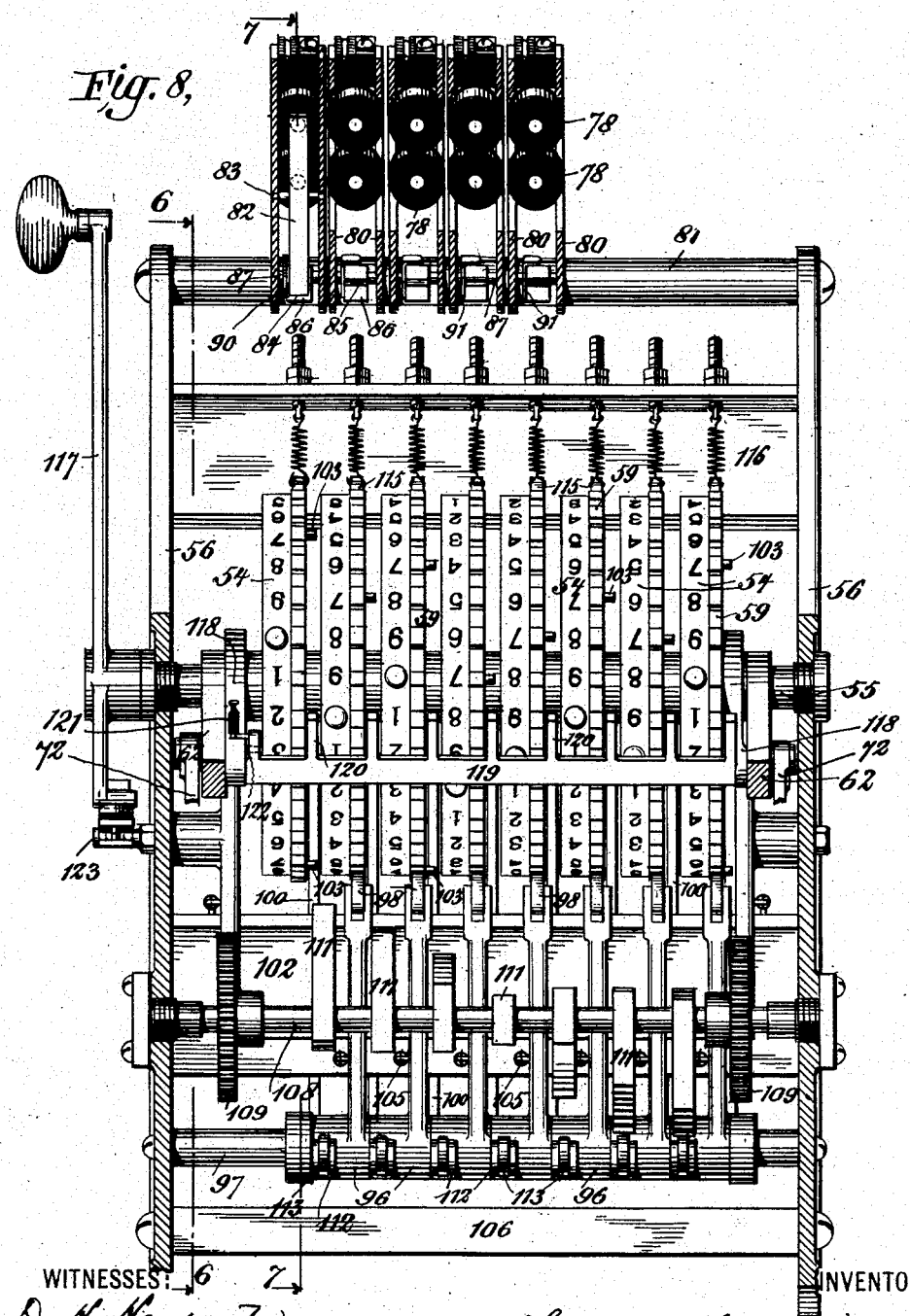

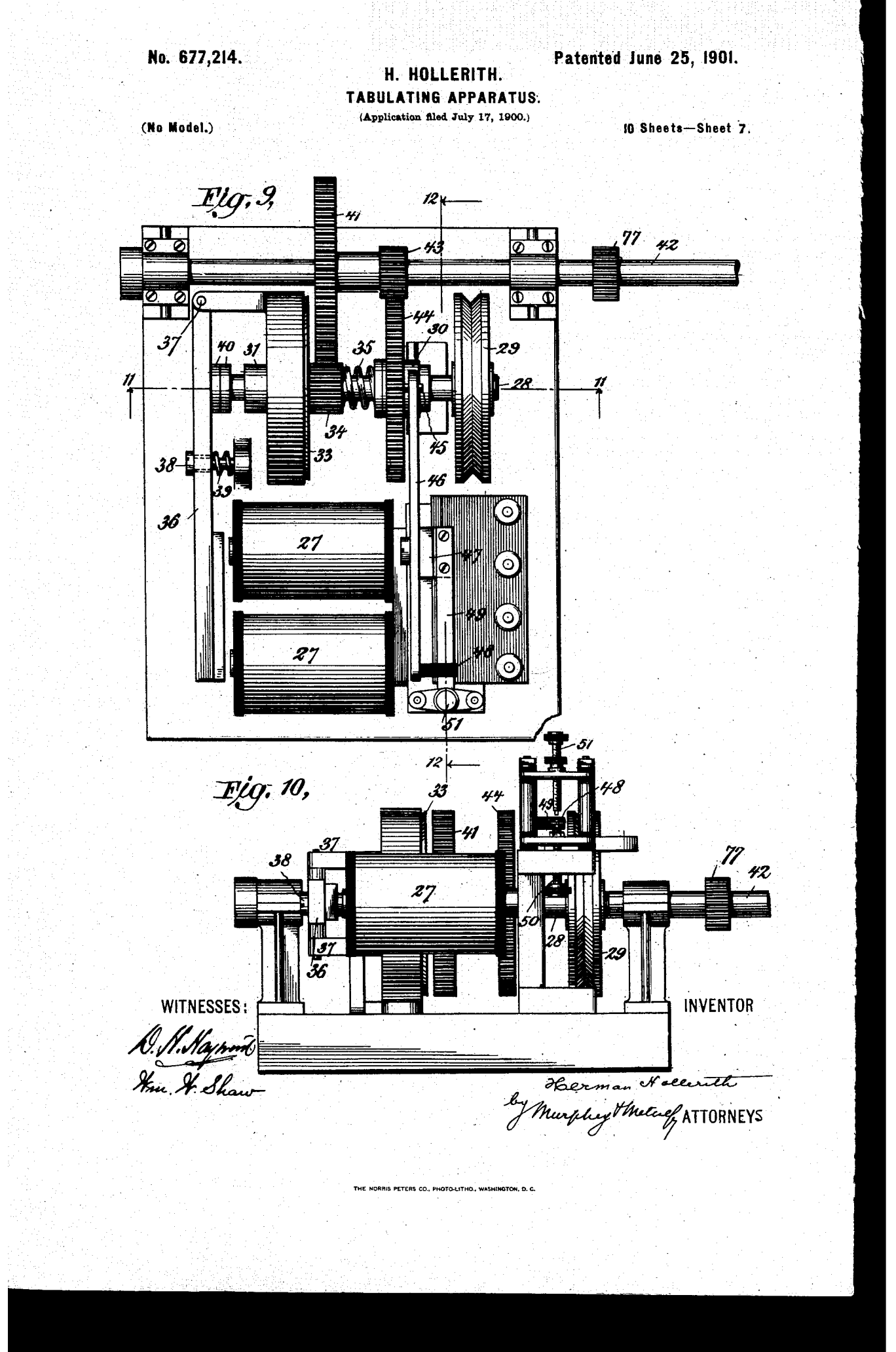

No. 677,214. Patented June 25, 1901.
H. HOLLERITH.
TABULATING APPARATUS.
(Application filed July 17, 1900.)

(No Model.) 10 Sheets—Sheet 7.

Fig. 9.

Fig. 10.

WITNESSES: INVENTOR
D. H. Haymond Herman Hollerith
Wm. H. Shaw by Murphey & Metcalf ATTORNEYS

THE NORRIS PETERS CO., PHOTO-LITHO., WASHINGTON, D. C.

No. 677,214. Patented June 25, 1901.
H. HOLLERITH.
TABULATING APPARATUS.
(Application filed July 17, 1900.)
(No Model.) 10 Sheets—Sheet 8.
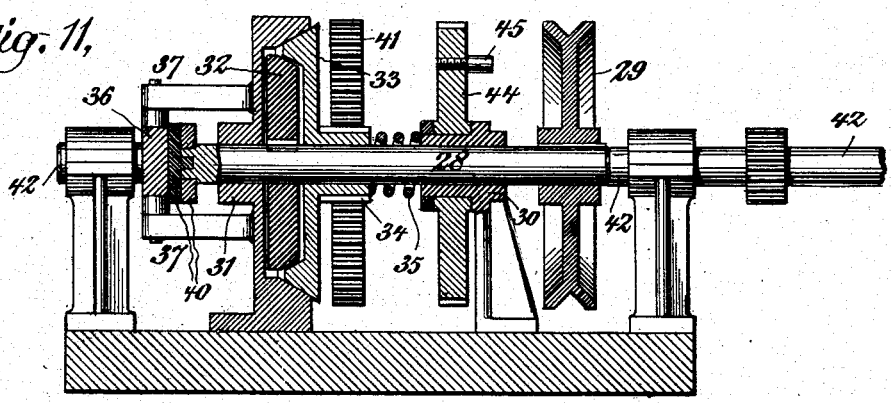
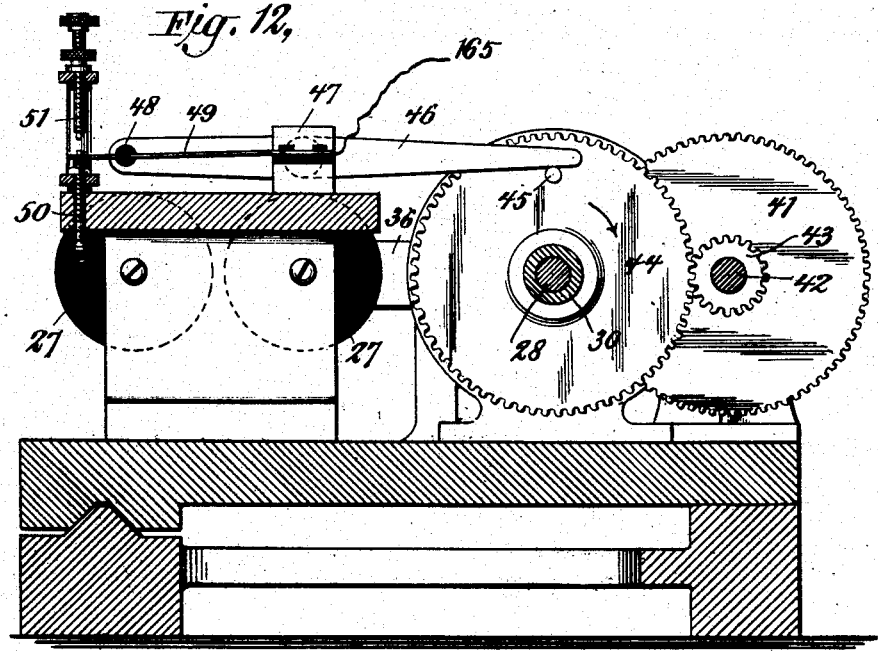
WITNESSES: INVENTOR
D. N. Nayport Herman Hollerith
Wm. H. Shaw BY
Murphy & Metcalf
ATTORNEYS

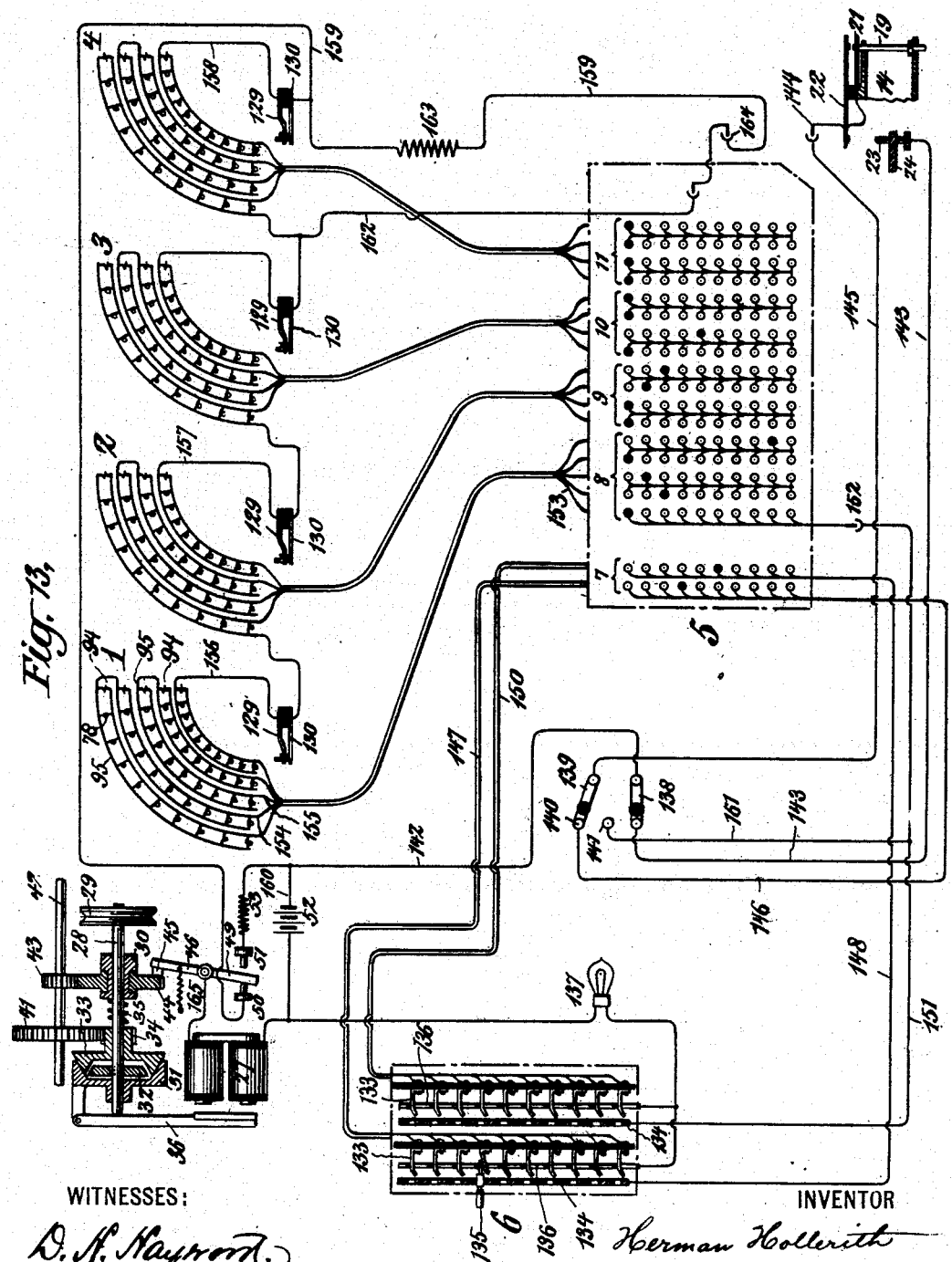

No. 677,214.

H. HOLLERITH.
TABULATING APPARATUS.
(Application filed July 17, 1900.)

(No Model.)

Patented June 25, 1901.

10 Sheets—Sheet 10.

*Fig. 14.*

INVENTOR
Herman Hollerith
BY
Murphy & McGuiness
ATTORNEYS

WITNESSES:

UNITED STATES PATENT OFFICE.

HERMAN HOLLERITH, OF GARRETT PARK, MARYLAND.

TABULATING APPARATUS.

SPECIFICATION forming part of Letters Patent No. 677,214, dated June 25, 1901.

Application filed July 17, 1900. Serial No. 24,019. (No model.)

*To all whom it may concern:*

Be it known that I, HERMAN HOLLERITH, a citizen of the United States, and a resident of Garrett Park, Montgomery county, Maryland, have invented certain new and useful Improvements in Tabulating Apparatus, of which the following is a full, clear, and exact description, reference being had to the accompanying drawings, forming part of this specification.

My invention relates to improvements in means and apparatus for tabulating data, such as statistical items which have been designated in or upon a suitable record.

For the purpose of simplicity and clearness of description, but without intending to thereby place any limitation or restriction upon my invention, I will in describing it refer to apparatus which I have specially designed and arranged for the tabulation of statistics relating to the transportation of freight. The apparatus is arranged to classify the data designated upon the record and to totalize and register the items of each class or group separately upon a register as each record is presented to the apparatus, and the special form of apparatus which I have selected for the purpose of this description comprises a controller arranged to coact with a record upon which have been designated four groups of items to be tabulated, four registers—one for each group and each comprising a plurality of indicators, eight in number—arranged in decimal progression from units to tens of millions, actuating mechanism for five of these indicators whereby each of them is controlled directly by the coaction of the controller and the record independently of the action of any other indicator in the register, carrying devices from each indicator to the one next higher in series, resetting devices for moving the indicators to zero when the tabulation of any series of items is completed, a selector which will prevent the operation of the indicators and may also operate a signal in case of error in the selection of a record for tabulation in any series, an arrangement of electrical circuits and devices the action of which is controlled or governed by the record, and other devices and features which will be referred to in the detailed description of the apparatus. This particular form of apparatus is designed for electrical operation and for the tabulation of items of value and amount by the decimal system; but it is apparent that electrical operation is not essential as to many of the important features of my invention and that my invention may be employed for the tabulation of data of any character or description, either by the decimal or any other system of enumeration. Furthermore, the arrangement, form, and character of the record, the number, and especially the construction and arrangement, of the registers, indicators, and actuators and the parts thereof, and the apparatus, devices, and means coöperating therewith may be widely varied without involving any departure from my invention.

In the drawings, Figure 1 represents a general top or plan view of the tabulating apparatus embodying my invention. Fig. 2 is a central transverse sectional view of the preferred form of controller. Fig. 3 is a transverse sectional view of the same, taken upon the plane of the line 3 3 of Fig. 1. Fig. 4 is a transverse sectional view of a selector. Fig. 5 represents a side elevation of one of the registers. Fig. 6 represents a vertical section of the same, taken upon the plane of the line 6 6 of Fig. 8. Fig. 7 represents a vertical section of the same, taken upon the plane of the line 7 7 of Fig. 8. Fig. 8 represents a vertical transverse section of the same, taken upon the plane of the line 8 8 of Fig. 7. Fig. 9 is a top view of certain clutch and starting mechanism employed. Fig. 10 is a front view of the same. Fig. 11 represents a longitudinal section of the same, the plane of section being taken upon the line 11 11 of Fig. 9. Fig. 12 represents a transverse section of the same, the plane of section being taken upon the line 12 12 of Fig. 9. Fig. 13 is a diagrammatic view of the system of electrical circuits employed in this apparatus. Fig. 14 is a view of a record-card suitably prepared for coaction with the controller.

Similar reference characters designate corresponding parts in all the views.

In the tabulation of statistics relating to the transportation of freight the items of each invoice which may be tabulated are, for instance, first, weight, (in pounds;) second, proportional charge, (in dollars and cents;) third, advance charge, (in dollars and cents,) and, fourth, prepaid charge, (in dollars and cents.) The items are transferred from the way-bills to a record. This is a simplified form for this special work, and for the tabulation of the items referred to consists of a card (shown in in Fig. 14) upon which are printed columns of numerals from "0" to "9," arranged in groups numbered 7, 8, 9, 10, and 11. The group 8 contains numerals for items of weight, group 9 for proportional charge, group 10 for advance change, and group 11 for prepaid charge. Assuming now an entry upon a way-bill from one station (indicated by the number "35") showing weight two thousand one hundred and eight pounds, proportional charge twelve cents, advance charge four dollars, and no prepaid charge, these items are transferred to the record-card by punching out the figures "3" and "5" in columns 1 and 2, respectively, of group 7, indicating the station or series to which the card belongs, the "0," the "2," the "1," the "0," and the "8" in the five columns of group 8, the "0," the "0," the "1," and the "2" in the four columns of group 9, the "0," the "4," the "0," and the "0" in the four columns of group 10, and the four ciphers in the four columns of group 11. These perforations in the record-card will thus correctly represent the items to be tabulated relating to this particular invoice. Items of the same character are similarly transferred to other similarly-prepared cards, each card representing one invoice, and all cards belonging to the same series or station are of course placed together and the items tabulated therefrom, as hereinafter described.

The register 1 is controlled through the perforations in group 8, the register 2 through the perforations in group 9, the register 3 through the perforations in group 10, and the register 5 through the perforations in group 11. The selector 6 is controlled through the perforations in group 7.

The controller to which I have referred is provided with a stationary bed 13 and with a movable platen or "pin-box" 14. The bed 13, upon which a record-card is shown in position, is formed of non-conducting material and has arranged therein a number of cup-like recesses 15, which are partially filled with mercury and which are so arranged that one of said cups will be immediately below each character on the record-card when the latter is placed upon the bed 13 and properly positioned thereon. A binding-post arranged to receive a conducting-wire of the electrical circuit enters each of the mercury-cups. The pin-box 14 is provided with a number of insulated spring-pressed conductive fingers 16, one for each possible perforation in the record-card. These are so arranged that when the platen is brought down by the handle 17 one of the pins, if unobstructed, will enter each mercury-cup. Gages 18 are arranged upon the bed to correctly center the record-card thereon. Each pin is electrically connected in the circuit of the apparatus so as to form the opposite terminal for the cup which it enters. If, therefore, a punched record-card be placed in position upon the bed 13 and the platen 14 be moved downwardly, such of the pins as are opposite the perforations in the card will pass through the perforations and complete an electrical connection between the conductors connecting with the pins and those connecting with the mercury-cups, while the pins which are not opposite perforations will be held back by the record-card and prevented from entering the mercury-cups.

The electrical devices by which this particular apparatus is operated are all connected in series, so that if the circuit be open at any point the indicators will not be operated. I am thus enabled to provide a simple device by which upon failure to insert a card in the controller no action of the registering apparatus will take place when the pin-box or platen is lowered. This consists of the spring 19, carried by the pin-box, and which registers with the opening 20 in the bed 13, and which is arranged to come in contact with the card and be pressed upwardly relatively to the pin-box when the latter is lowered. Two normally-separated metallic spring-tongues 21 and 22, insulated from each other, are carried by the pin-box. When the latter is lowered, the projecting end of the spring 22 will contact with the adjustable circuit-terminal 23, carried by the arm 24. The spring 21 forms the opposite terminal of the circuit. If, therefore, a card be in position when the pin-box is lowered, the descent of the pin 19 will be arrested and will press the spring 21 upwardly into contact with the spring 22, so that the circuit will be closed when the opposite end of arm 22 contacts with the terminal 23. If, however, no card be in the controller the pin 19 will enter the opening 20 and will exert no action on arm 21, so that the circuit will remain open between the terminals 21 and 22. A spring 25 is arranged to return the platen or pin-box to its initial position when the operator releases the handle 17, and a buffer 26 prevents undue shock when the pin-box is rapidly operated.

At each operation of the pin-box, with the record properly perforated and in proper position, a complete circuit is established through the apparatus, and the starting-magnet 27 (shown diagrammatically in Fig. 13 and in detail in Figs. 9 to 12) will be energized and will bring into operative connection a constantly-driven power-shaft 28 and an operating-shaft 42, which runs only when said connection is established. The shaft 28 is journaled in suitable stationary bearings 30 and 31, in which it also is free to move longitudinally. Secured rigidly to said shaft is the clutch member 32, while the other member, 33, of the clutch is loosely mounted on said shaft and has secured to it the pinion 34. A coil-spring 35 tends to hold the inclined face of the clutch member 33 against the face of the stationary flange shown as formed integrally with the bearing 31. The clutch member 33 is also provided with an integral inclined face, which is arranged to form the clutch engagement with the member 32.

The armature of the starting-magnet is secured to the lever 36, pivotally mounted upon a fixed support 37, and the outward movement of said lever is limited by the stop 38, while the spring 39 normally holds said lever against said stop. The armature-lever 36 engages with the end of the power-shaft 28, preferably through the medium of the bearing-disks 40. (Shown in Figs. 9 and 11.) The parts are shown in Figs. 9 to 13 in their normal position when the circuit is open and the magnets 27 deënergized. Upon the closing of the circuit the magnet 27 will attract the armature, which will cause the power-shaft 28 to move longitudinally in its bearings, carrying the rotating clutch member 32 into engagement with the member 33 and moving the latter out of engagement with the internal conical face of the flange of the stationary bearing 31. As soon as this is effected the clutch and the shaft 42 will be caused to rotate until the circuit through the starting-magnet is broken, when the spring 39 will force the armature-lever back against the stop 38, and the spring 35 will force the clutch member 33 into engagement with the conical face of the bearing 31, which forms a brake, and thus immediately stops the rotation of said clutch member and of the shaft 42. The bearing-disks 40, one of which is loosely mounted on the shaft 28, permit that shaft to revolve freely notwithstanding the longitudinal pressure exerted by the armature-lever 36.

Upon the shaft 42 is mounted to rotate therewith a pinion 43, which meshes with the spur-wheel 44. The shaft 42 also carries a pinion 77, which meshes with spur-gears on the operating-shaft of each register, and the gears are so proportioned that the register-operating shafts and the spur-wheel 44 will revolve synchronously. The spur-wheel 44 carries a pin 45, which has a cam-like action upon one end of the lever 46, pivotally mounted upon a support 47. The opposite end of said lever carries an insulated stud 48, which loosely engages with a spring contact-tongue 49 in electrical connection with the magnets 27. The tongue 49 is arranged to contact with the terminal 50 when the cam or pin 45 lifts the end of the lever 46 with which it engages when the apparatus is in its non-operating position. When the starting-magnets are energized and the spur-wheel 44 is rotated to carry the pin 45 out of engagement with the lever 46, the lever will rock upon its support and the tongue 49 will immediately contact with the terminal 51, and such contact will be maintained until the wheel 44 is completing its revolution, when it will be broken and contact again established with contact 50.

Each of the registers 1, 2, 3, and 4 will preferably be designated by some inscription which will indicate the character of data which it is to tabulate, and it will be understood that as many registers and as many groups of characters on the records are employed as there are classes of data or statistical items. The construction of the registers is shown most clearly in Figs. 5 to 8. Each register contains any desired number of registering elements or indicators 54. In the operation of registering these indicators necessarily have imparted to them a progressive movement in one direction, and they are preferably, although not necessarily, in the form of revolving wheels or disks. The register 1 (which I have selected for the purpose of detailed description) contains five indicators, which are actuated directly and independently by the actuators, and three additional indicators, which are actuated only by the carrying devices. This register will therefore tabulate directly at one operation single items as large as ninety-nine thousand nine hundred and ninety-nine, and as other items are added the operation of the carrying mechanism will permit the registration of totals as large as ninety-nine million nine hundred and ninety-nine thousand nine hundred and ninety-nine. In the registers 2, 3, and 4, which are controlled by groups containing only four columns of characters, it will be unnecessary to provide means for directly actuating more than four of the indicators. In the form shown and for convenience three sets or series of numerals from "0" to "9," inclusive, are carried on the periphery of each indicator 54. The indicators are journaled to rotate upon the shaft 55, supported by the side frames 56, and an opening 57 is formed in the front 58 of the register. The front 58 is supported by the side frames and serves to conceal the mechanism of the register, as well as all the numerals on the indicators except those which are opposite the opening 57, in which position they indicate a registry. The indicators are provided with peripheral ratchet-teeth, one for each numeral on the indicator. The actuating mechanism 60 for each of the directly-actuated indicators is adapted to impart at each operation each time it traverses its path of movement a variable movement to one or more of the indicators, the extent of which is governed or controlled by the means employed to effect the engagement of the indicators and actuating mechanism. The actuating mechanism which I employ in the special form of register which I am now describing comprises a transverse bar 61, mounted upon side arms 62, loosely journaled on the shaft 55. The side arms 62 are also connected and braced by the transverse bar 63. A pawl 64 for each of the directly-actuated indicators is pivotally mounted at 65 in suitable supports 66, carried by the transverse bars 61 and 63, and a coil-spring 67 for each pawl tends to rock the pawl upon its pivot, so that the pawl when released may engage the teeth 59 of its indicator. Each pawl has a latch 68, which normally holds it out of engagement with the ratchet-teeth 59 by engaging with the pin 69, with which each pawl is provided. The latch 68 is pivotally mounted at 70 upon the support 66, and a spring 71 (shown in dotted lines, Fig. 7) tends to hold the outer end of the latch up against the bar 63. Connecting-rods 72 connect the side arms 62 with the spur-wheels 74 on each side of the register. The spur-wheels 74 are mounted upon the register-operating shaft 75, journaled in bearings 76, carried by a plate extending across the register and secured to the side frames 56. The spur-gears 74 mesh with the pinions 77, secured to the shaft 42. A single revolution of the spur-gear 74 will therefore cause a reciprocation of the actuating mechanism through a fixed range of movement, such range of movement being at least sufficient to cover nine of the ratchet-teeth on the indicators.

The means which I employ in the form of apparatus herein shown and described for determining the extent of movement imparted to each indicator at each operation or stroke of the actuating mechanism comprises a plurality of electromagnets 78, mounted upon yokes 79, which are secured between a pair of sector-plates 80, carried by the crossbars 81, which extend between and are supported by the side frames 56. As shown, there are nine magnets for each of the directly-actuated indicators. Each magnet 78 is provided with an armature 82, pivotally supported at 83. Each armature is provided with a hooked end 84, arranged to engage with a tooth 85 upon the tripping-pawl 86, which is pivotally supported at 87. Normally the armature 82 and the pawl 86 are in the position shown in the first and second magnets (counting from the top) of Fig. 7. As stated, each register is controlled by one group of characters on the record, and each of the magnets 78 of each series in each register is controlled by its own corresponding character in one of the columns of the record. Thus the coils of the first magnet (from the top) in the series which effects the engagement between the units-indicator and the actuating devices of the register 1 are electrically and independently connected with a mercury-cup, which is controlled by the character "1" in the units or right-hand column of group 8, the coils of the second magnet in said series with the cup controlled by the character "2" in said column, the coils of the first magnet in the next adjacent series—the series for the tens-indicator—with the cup controlled by the character "1" in the next or tens column of said group, and so on for each magnet in each series in each register. If, therefore, the characters "1" and "2" be punched out of the first two columns of group 8 in the record and the controller be actuated to close the circuit through the perforations to the mercury-cups controlled by such perforations, as previously described, the second magnet of the units series and the first magnet of the tens series will be energized and the tripping-pawls 86 of each of said magnets will be released. If now the indicator-actuating mechanism be moved through its path of movement by the rotation of the spur-wheel 74, the ends of the latches 68 opposite said pawls will be engaged by the latter, lifting their hooked ends and releasing the pawls 64. The pawl of the units-indicator-actuating mechanism will engage that tooth of its indicator which is opposite the second magnet of its series and that indicator will be rotated the distance of two teeth or two of the peripheral numerals. The pawl of the tens-actuating mechanism will engage that tooth of its indicator which is opposite the first magnet of its series, and the tens-indicator will be rotated the distance of one tooth or one numeral, thereby adding twelve to the number previously registered. If a number is to be added which contains a cipher, no movement of the indicator controlled by that column of the record will be necessary; but it will be necessary with the arrangement of circuits which I have already described to punch out the ciphers where they occur in any number to be added. A resistance-coil 94 is therefore provided in each series of magnets and is connected with each of the mercury-cups controlled by the ciphers in each column of the record, the resistance of said coil being equal to the resistance of the coils of one of the magnets 78. After the latches 68 have been tripped the upward movement of the indicator-actuating mechanism will cause the rotating wheels 89 to engage with such of the pawls 86 as have been released and will press the same backwardly, and the hooked end of the armature will reengage the tooth 85 on each of such pawls and will retain it in its normal non-operating position, its magnet having at this period of the operation of the register been deënergized by the action of the spring-tongue 49, previously described. I have provided the hooked end of each armature 82 with a pin 90, and a projection 91 upon each pawl 86 carries a cam-like surface, which is so arranged relatively to the pin that when a pawl is pressed back by the wheel 89 the cam 91 will engage the pin 90, lifting that end of the armature and positively separating the armature and magnet-poles, thus overcoming any tendency of the armature to stick should there be sufficient residual magnetism in the poles after the circuit is broken to overcome the force of the spring 88.

In the apparatus shown the limit of the forward movement of the indicator-actuating mechanism is reached when the spur-wheel 74 has completed a half-revolution from its normal non-operating position, and the remainder of the revolution of the spur-wheel carries said actuating mechanism back to its initial position, thus, as will be more fully described hereinafter, each operation of the apparatus or of the controller producing one forward and return movement or one complete operation of the actuating mechanism through its fixed range or path of movement. As the actuating mechanism approaches the end of its complete movement due to one complete revolution of the spur-wheel 74, the pawls 69, which have been tripped during the forward movement of the actuating mechanism, will be reset or returned to their initial position by the engagement of their lower ends with the bar 92, rigidly supported by the arms 93, secured at each side of the register to the cross-bar 81.

The carrying devices between the indicators are arranged in the special form of register illustrated to carry each tenth unit of movement from each indicator to the one next higher in the series, and as the direct movement of the indicators by their actuating means is produced on the forward movement of the latter I have arranged the carrying devices to operate on the return movement, so that the two movements of the indicators shall not conflict. The carrying device comprises a plurality of bell-crank levers 96, journaled upon a stationary shaft 97. Said levers are provided with one vertical and two horizontal arms. The vertical arm carries a spring-actuated pawl 98, which engages with the teeth 59 of the indicator which is actuated by the carrying device. The forwardly-extending horizontal arm of each lever is provided with a pin 99, which engages with a latch-lever 100, pivotally mounted upon a fixed pin 101, carried by a plate 102, secured to the side frames of the register. The indicators are provided with three pins or studs 103, (shown in Fig. 7 in dotted lines and in Fig. 8 in full lines,) one for each series of numerals on the indicators. The upper end of the latch-lever 100 is provided with an inclined face, which lies in the path of the studs 103 on the indicator from which the carrying device is actuated. Thus in carrying from units to tens the pawl 98 will engage with the tens-wheel, while its latch 100 will engage the studs on the units-wheel. The studs 103 are so arranged on the indicators that as the indicators are actuated to move the numeral "9" of any series of numerals on any indicator below the sight-opening 57 the stud for that series of numerals will engage with the inclined face of the lever 100 and will rock said lever and release the pin 99 on the bell-crank lever, and under the action of spring 105 the vertical arm of said lever will be drawn forward until arrested by the engagement of the forwardly-extending horizontal arm with the cross-bar 106. The parts are so proportioned that this forward movement of the bell-crank lever produced by the action of the stud on one indicator of the series will cause the pawl to move over and pick up one ratchet-tooth on the next higher indicator. Springs 107 tend to hold the latch-levers in operative position. A shaft 108 carries a series of radial cams 111, one for each bell-crank lever. Gears 109 and 110 cause said shaft to rotate with shaft 75, but in the opposite direction, so that the cams 111 will be rotated in the direction shown by the arrow in Fig. 7. The rearwardly-extending arms 112 of the bell-crank levers 96 carry antifriction-rollers 113, which are moved up into the path of the cams 111 when said levers are released by the latch 100 and drawn forward by the spring 105. Assuming now that the register shows a registry of "99," "9" on the units and "9" on the tens-indicator, and the actuating devices by the means to be presently described are actuated to add six to this number, one of the studs 103 will by the movement of the units-indicator release its latch-lever as the numeral "9" thereon passes below the sight-opening. The indicator will be moved until the numeral "5" appears opposite the opening and will there rest as the indicator-actuating means reaches the limit of its forward movement. By the release of the latch-lever the bell-crank lever 96 controlled thereby is also released, and the pawl 98 will be drawn forward to pick up one ratchet-tooth on the tens-indicator. The roller 113 on the bell-crank lever will be at the same time thrown into the path of the cam 111 nearest the left-hand side of the register, Fig. 8. The cams 111 are arranged in angular relation with each other upon the shaft 108, so that they will come into operative position successively, beginning with the cam at the left, just referred to, which is adjusted to engage the roller 113 as soon as the indicator-actuator commences its return movement. The engagement of said cam with said roller will force the arm 112 and roller 113 downwardly. The cams 111 are so proportioned that the movement of the bell-crank lever so produced will move the pawl 98 and the indicator with which it engages (the tens-indicator) the distance of one tooth, or from "9" to "0," bringing the cipher opposite the sight-opening. This movement of the tens-indicator will release its latch 100 in exactly the same way as the latch for the units-indicator was released and will throw the roller 113 on the second bell-crank lever into the path of the second cam. The continued rotation of the cam-shaft 108 during the return of the indicator-actuator means will cause this cam to move the pawl which engages the hundreds-indicator the distance of one tooth, which will move the hundreds-indicator from "0" to "1," and the registry will be "105," no further action of the indicators occurring during the remainder of the return movement of the actuators. As the arms 112 are forced down by the cams the pin 99 on the opposite horizontal arm of the bell-crank lever will ride up the beveled lower end 114 of the latch 100, forcing the latch back and permitting the pin to reëngage the hook formed therein.

The resetting device, by which all the indicators of each register are returned to their initial or zero position after the completion of one tabulation, comprises a resetting-lever 117, rigidly secured to the shaft 55, to which are also rigidly secured the arms 118. A bar 119, provided with a series of pawl-like fingers 120, one for each indicator, is pivotally mounted in the arms 118. A spring 121 tends to hold an arm on the bar 119 against the stop 122, carried by one of the arms 118. In the normal or non-operating position of the bar 119, however, the fingers 120 will rest upon the studs 103 of such of the indicators as are in their initial or zero position, the arm on the bar 119 being lifted clear of engagement with the stop 122; but when deprived of the support afforded by the studs 103, either by the rotation of the indicators or the forward movement of the bar, the latter under the action of spring 121 will cause the bar to rotate slightly until its arm contacts with the stop 122. The studs 103 on such indicators as have been advanced from their zero position will then lie in the path of the ends of the fingers 120 when the latter are moved forward by operating the resetting-lever 117, which will rotate the shaft 55 and carry forward the arms 118 and finger-bar 119. The resetting-lever 117, and consequently the fingers 120, are limited in their forward movement by the stop 123, secured to the side frame 56, Fig. 5, and in their return movement by the engagement of the arm 132 of the resetting-lever with the lug 131, carried by the spring-tongue 129. If, therefore, any of the indicators have been advanced from their zero position, so that any of the numerals from "1" to "9" appear opposite the sight-opening 57, when the resetting-lever 117 is actuated, as described, the fingers 120 of all the indicators which have been advanced will in their forward movement engage the studs 103 and rotate said indicators until the zeros of the next series of numerals appear opposite the opening 57, when their movement will be arrested by the engagement of the lever 117 with the stop 123. The indicators will then all read zero. The pawls 115 will prevent any movement of the indicators during the return movement of the resetting devices, and when the return movement of the latter is arrested by the lug 131 the fingers 120 will all rest on the studs 103 belonging to the next series of numerals on the indicator.

With the special form of indicators which I have herein shown and described, when the indicators are moved forward by the engagement of the fingers 120 with the studs 103 the studs of the preceding series of numerals on the indicators so advanced will, owing to the relative arrangement of the parts, engage with and trip the latch-levers 100 of such indicators. To prevent the tripping of the levers 100 from releasing the carrying mechanism, (which would then be operated on the next return movement of the actuators,) I provide a spring-actuated bar 124, carried by the pivoted arms 125, which are mounted on the studs 126, projecting from the side frames 56. The bar 124 extends across the front of the register and normally stands away from the bell-crank levers 96, so as not to interfere with their regular operation; but when the resetting devices are actuated the cams 127, secured to the shaft 55, will engage with the rollers 128, carried by each of the pivoted arms 125, swinging the bar 124 in against the bell-crank levers 96 and holding the latter, so as to prevent the pawls 98 from being drawn forward by springs 105 if the latches 100 are released. The levers 96 are thus held firmly against movement during the remainder of the resetting movement of the indicators.

To prevent the accidental operation of the register while the indicators are being reset and to insure the return of the resetting devices to their proper position, I provide a circuit-controlling device consisting of the spring arms or contacts 129 and 130, insulated from each other at their points of support and each forming a terminal for the circuit through the magnets 78. The arm 129 carries a lug 131, and when the resetting-lever is in its normal position, as shown in Fig. 5, the lower end of the arm 132 bears against said lug and holds the arms 129 and 130 in contact; but when the arm 117 is moved even slightly from the position shown the arm 132 will be carried out of engagement with the lug and the resiliency of spring 129 will cause it to spring upwardly. Its contact-point will be separated from that of the arm 130 and the circuit will be opened at this point and will remain open until the resetting-lever and the devices connected therewith are returned to their normal position.

The selector to which I have previously referred is shown diagrammatically in Fig. 13 and in detail in Fig. 4. It is designated by the reference character 6 and comprises two rows of contact-springs 133, one for each column of characters in group 7 of the record shown in Fig. 14. Each of the springs 133 is electrically connected with its corresponding mercury-cup of the controller. For instance, the fourth spring from the top in the left-hand row, Fig. 13, is connected with the cup corresponding with the "3" in the tens-column of group 7 and the sixth spring in the right-hand row with the cup corresponding with the "5" in the units-column of the same group. In front of each row of springs are conducting-bars 134, having plug-holes corresponding to the springs 133. The springs normally contact with the conducting-strips 136; but such contact is broken by the insertion of the plugs 135, as shown in Fig. 4. When the plugs are inserted in the proper holes and the cards presented to the controller are properly punched for the series corresponding to the location of the plugs, the circuit through the controller will be properly completed, as will be described presently; but if a record belonging to another series be accidentally inserted in the controller, so that the current reaches any of the springs not in contact with the switch-plugs, a circuit will be completed through the conducting-strips 136 and the lamp 137. Thus the circuit through the controller will not be completed, the apparatus will fail to register, and the operator will be notified of the error by the flashing of the lamp or by such other signal as may be substituted therefor. I have shown a selector which will include ninety-nine series. Obviously its capacity may be increased indefinitely, and, if desired, the remainder of the apparatus may be operated without employing the selector, which is used only for the purpose of detecting error in the sorting or classification of the cards. In case the selector be not employed it is to be cut out of circuit by throwing the switch from the contact 140 to the contact 141.

Should there be no number to be registered on any one of the registers, it will be necessary in employing the apparatus I have already described to punch out all the ciphers in that group of the record which controls such register in order to establish the circuit through the apparatus. If the omitted items are sufficiently numerous, however, I obviate the necessity of so much punching by making a single perforation in the record-card, whereby any one or more of the registers may be entirely cut out of circuit. For this purpose I provide the record with a character or series of characters, one for each register which it is desired to cut out of operation. For these characters corresponding pins and mercury-cups are arranged in the controller. To simplify the drawings and description, I have shown and will describe means by which only the register 4 is cut out of operation; but it will be readily understood that any one or more of the registers may be similarly arranged. In preparing a record where there is no item to be registered in group 11 (on register 4) the character "X" is punched out and no perforations are made in group 11. The pin and mercury-cup controlled by this perforation are connected, respectively, with the terminal 130 on register 3 by the conductor 162, Fig. 13, and by the return-conductor 159 to the generator 52 through the resistance 163, the resistance of which is intended to equal that of the register 4. The circuit will thus, upon the operation of the controller, be established around the register 4 from the terminal 130 of register 3 to the return-wire 159.

In addition to the spring-pins and mercury-cups corresponding to the characters delineated upon the record certain other spring-pins and cups 144 and 152 are arranged in the controller just outside of the edges of the card when it is properly inserted in the controller, so that if the card be not correctly placed in the controller these pins will strike the card when the controller is operated and the circuit through the system will remain open at these points. Any desired number and arrangement of these safety contact-pins may be employed.

The apparatus which I have herein shown and described as embodying my invention in one of its forms arranged for the class of work referred to is operated as follows: The record-cards pertaining to one series having been properly punched, the switch-plugs 135 are inserted in the selector, so as to engage the springs connected with the mercury-cups controlled by the perforations of the series being tabulated. In the case of the card illustrated the plugs would be inserted in the fourth hole in the left-hand and in the sixth hole in the right-hand bars 134. A record-card is then inserted in the controller, the handle 17 is depressed, and assuming that this particular card be punched, as shown in Fig. 14, the circuit will be completed as follows: From the generator 52 by conductor 142, switch 138, conductor 143 to the controller contact-terminal 23, through spring-contacts 21 and 22, safety contact-pin and cup 144, conductor 145, switch 139, conductor 146 to all the spring-pins controlled by the first or tens column of the selector group 7 of the record, to the mercury-cup controlled by character "3" in said column, thence by one of the conductors in the cable 147 to the fourth spring (from the top) in the tens or left-hand column of the selector, through the plug which connects the same to the bar 134, to conductor 148, to the pins controlled by the units-column of group 7, to the mercury-cup controlled by the character "5" in said column, by one of the conductors in cable 150 to the sixth spring of the selector, through the conducting-plug in contact therewith to its bar 134 and conductor 151 to the safety contact-pin and cup 152, to the pins controlled by the fifth column (that at the left) of group 8, to the mercury-cup controlled by the cipher of said column, (that character having been punched,) through its conductor carried by cable 153 to the resistance-coil in the corresponding or fifth series of magnets in register 1, (this, as shown in the diagram, being the outside series,) by the return-conductor 95 to the coils of the second magnet in the fourth series, (releasing the tripping-pawl of such magnet,) by the conductor in cable 154 to the mercury-cup controlled by the character "2" in the fourth column of group 8, (that character having been punched,) through the spring-pin for said cup to a common return for all the pins controlled by the fourth and third columns of said group, to the mercury-cup controlled by the character "1" of the third column, by its conductor carried by the cable 155 to the first magnet in the third series, (releasing the tripping-pawl of such magnet,) thence to the resistance connected with the second series of magnets, thence by the conductor carried by the cable to the mercury-cup controlled by the cipher in the second column of group 8 of the record, to its pin and to the common return for all the pins controlled by the first and second columns of group 8, thence to the cup controlled by the "8" in the first or units column of said group, thence by the conductor carried by the cable to the coils of the eighth magnet in the first series of magnets, (releasing the pawl of such magnet,) thence by conductor 156 to the spring-contact 129, to the contact 130, and thence to the register 2, and so on through the magnet or resistance coils of each register and through the controller, as described for the register 1. In each register the tripping-pawls 86 of the magnets corresponding with perforations in the record-card will be released as the circuit is completed through the magnet-coils. From the contact 130 of the last register, 4, the current will pass by conductor 159 to the contact 50 through the conducting-strip 49 and the coils of the starting-magnet 27, back to the generator. Immediately upon the completion of the circuit, as described, by the lowering of the pin-box the coils of the starting-magnet are energized and the clutch mechanism, Figs. 9 to 11, is operated thereby to throw the constantly-driven shaft 28 into gear with the shaft 42, which will rotate the shaft 42, carrying the pinion 77, which meshes with the spur-wheels 74 of each register, and will also rotate the wheel 44, Figs. 9 and 12, and carry the pin 45 out of engagement with the lever 46, thereby throwing the conducting-strip 49 out of contact with terminal 50 and into contact with terminal 51, breaking the circuit through the registers and controller and establishing the circuit from the generator through conductor 160, resistance 53, contact 51, conducting-strip 49, conductor 165, magnet 27, and back to the generator. The shifting of the circuit through the starting-magnets is practically instantaneous and does not stop the rotation of the spur-wheels 74, which are started as soon as the circuit is first completed through the controller and which, notwithstanding the breaking of the circuit through the controller by its return to its initial position, continue their movement when the circuit is shifted to the control of the motor (through the action of the pin 45 on wheel 44) until said wheel 44 makes one complete revolution, when the pin 45 will again engage lever 46 and carry the strip 49 out of contact with terminal 51 and into contact with terminal 50. This will instantly stop the rotation of the spur-wheels 74, owing to the release of the armature-lever 36 and the clutch mechanism and the engagement of the clutch member 34 with the stationary bearing 31. Returning to that point in the operation of the apparatus at which the pin-box has been lowered to complete the circuit through the prescribed magnets and the corresponding tripping-pawls have been released, the rotation of the spur-wheels 74 will operate the indicator-actuating mechanism and cause the tripping-pawls to release the pawls of the actuating mechanism, which will engage the indicators, moving the latter to register the numerals punched in the record. This is accomplished during the first half-revolution of the spur-wheels 74. During the remainder of the revolution on the return movement of the actuating mechanism the carrying devices are operated and the actuator-pawls are reset. By this operation the number "2108" will have been added to the registry of register 1, "12" to the register 2, "400" to the register 3, and nothing to the register 4. As soon as the control of the starting-magnets has been shifted from the controller the pin-box is released and returns to its initial position. The card is removed and another inserted. By this time the revolution of the operating mechanism will have been completed and the pin-box is again lowered, another operation of the apparatus is effected, and another series of items is added to those previously registered, and so on, until the tabulation is completed, when the total registry is suitably recorded and the indicators are all reset for another tabulation.

Having thus shown and described my invention, what I claim as new, and desire to secure by Letters Patent, is—

1. The combination of one or more indicators, actuating mechanism therefor, a plurality of devices for controlling the engagement of each indicator with the actuating mechanism and record-controlled means for actuating one only of said devices at each operation of the machine to impart a variable movement to the indicator.

2. The combination of one or more indicators, actuating mechanism therefor, engaging mechanism for connecting each indicator with the actuating mechanism, a plurality of devices for operating the engaging mechanism for each indicator and record-controlled means for actuating one only of said devices at each operation of the machine to impart a variable movement to the indicator.

3. The combination of a variably-movable registering-indicator, actuating mechanism therefor having a fixed range of movement, a perforated record and means controlled by the perforations in the record for determining the extent of movement imparted to the indicator at each operation of the actuating mechanism.

4. The combination of a plurality of registering-indicators, actuating mechanism for the indicators adapted to impart a variable movement thereto, a perforated record and means controlled by the perforations in the record for determining the extent of movement to be imparted to each indicator at each operation of the actuating mechanism.

5. The combination of a plurality of variably-movable registering-indicators, actuating mechanism for the indicators having a fixed range of movement, a perforated record and means controlled by the perforations in the record for determining the extent of movement to be imparted to each indicator at each operation of the actuating mechanism.

6. The combination of one or more indicators, actuating mechanism for the indicators, a single engaging device for each indicator carried by the actuating mechanism, a plurality of operating devices therefor arranged along the path of movement of each engaging device and each controlling the engagement of the indicator and its actuator at a different point in the movement of the actuating mechanism and record-controlled means for operating one of said operating devices at each movement of the actuating mechanism to impart a variable movement to the indicator.

7. The combination of one or more indicators, actuating mechanism therefor, a record, an engaging device for each indicator carried with the actuating mechanism and means controlled by the record and the movement of the actuator for operating the engaging device at a predetermined point in the movement of the actuating mechanism.

8. The combination of one or more indicators, actuating mechanism therefor, a record, an electrically-actuated engaging device for each indicator and circuit-closing devices controlled by the record for operating said engaging device at different points in the movement of the actuating mechanism, the point at which the engaging device is operated being determined by the record.

9. The combination of a plurality of registering-indicators, actuating mechanism therefor, a motor for operating the same, connecting mechanism between the actuating mechanism and the motor and electrically-controlled devices for operating said connecting mechanism.

10. The combination of a plurality of registering-indicators, a motor for operating the same, connecting mechanism between the indicators and the motor and electrically-controlled means for actuating the connecting mechanism for each indicator independently.

11. The combination of a plurality of registering-indicators, a motor for operating the same, connecting mechanism between the indicators and the motor, a record and means controlled by the record for actuating the connecting mechanism for each indicator independently.

12. The combination of a plurality of registering-indicators, actuating mechanism, a motor for operating said mechanism, record-controlled means for connecting each indicator with said mechanism, connections between the motor and said actuating mechanism and electrically-controlled means for operating said connections.

13. The combination of a plurality of indicators, actuating mechanism for the indicators, record-controlled means for determining the extent of movement imparted to each indicator at each operation of its actuating mechanism and carrying devices adapted to operate after the indicators have been moved by the actuating mechanism.

14. The combination of a plurality of indicators, actuators adapted on one movement to impart a movement to the indicators, record-controlled means for determining the extent of movement imparted to each indicator during such movement of its actuator and carrying devices between the indicators arranged to be operated during the opposite movement of the said actuators.

15. The combination with a plurality of indicators, actuating mechanism adapted in its movement to impart a movement to the indicators, a record and means controlled by the record for variably determining the extent of movement imparted to each indicator during the movement of the actuating mechanism and carrying devices between the indicators adapted to be operated during the return movement of the actuating mechanism.

16. The combination of a registering-indicator, actuating mechanism therefor, record-controlled means for controlling the movement of the indicator and a selector for controlling the operation of the actuating mechanism.

17. The combination of a registering-indicator, actuating mechanism therefor, record-controlled means for determining the extent of movement imparted to each indicator at each operation of its actuating mechanism and a selector for controlling the operation of the actuating mechanism.

18. The combination with the indicators and their actuating mechanism, of record-controlled means for determining the extent of movement imparted to each indicator at each operation of its actuating mechanism, a selector for controlling the operation of the actuating mechanism and a signal controlled by the selector.

19. The combination with an indicator, an actuator therefor, means for moving the actuator, record-controlled means for determining the extent of movement imparted to the indicator at each operation of its actuator, a selector governing the means for imparting movement to the actuator and a signal under the control of the selector and operated when the actuator fails to impart movement to the indicator.

20. The combination of variably-movable indicators, actuating mechanism therefor, an engaging device for connecting each indicator with its actuating mechanism and electrically-controlled devices for operating said engaging devices to determine the extent of movement imparted to the indicator at each operation of the machine.

21. The combination with the variably-movable indicators, of actuating mechanism having a fixed range of movement, an engaging device for connecting each indicator with its actuating mechanism, means for operating said engaging device at a predetermined point in the movement of the actuating mechanism, a motor, and electrically-controlled means for connecting and disconnecting the actuator and motor.

22. The combination of an indicator, an actuator therefor, an engaging device for the indicator carried with the actuator and record-controlled means for operating the engaging device at a predetermined point in the movement of the actuator.

23. The combination of an indicator, an actuator therefor having a fixed range of movement, a pawl carried with said actuator and adapted to engage with the indicator, a record-card and means controlled by the record-card for tripping the pawl at a predetermined point in the movement at the actuator.

24. The combination of a plurality of indicators, actuating mechanism therefor, pawls carried by the actuating mechanism for engagement with the indicators and record-controlled means by which said pawls may be tripped at predetermined points in the movement of the actuating mechanism.

25. The combination with the indicators and their actuating mechanism, of a pawl carried by the actuator, means for tripping the pawl at a predetermined point in the movement of the actuator, a motor and electrically-controlled means for connecting and disconnecting the actuator and the motor.

26. The combination with the indicators and their actuating mechanism, of a pawl carried thereby for each indicator, record-controlled means for tripping the pawl at a predetermined point in the movement of the actuating mechanism, and means for resetting the pawl after the indicator has been moved.

27. The combination with one or more indicators and their actuating mechanism, of a pawl for each indicator carried by the actuating mechanism, a latch for holding the pawl out of engagement with the indicator, and record-controlled means for operating the latch to trip the pawl at a predetermined point in the movement of the actuating mechanism.

28. The combination with a plurality of registers, each having a plurality of indicators, of actuating mechanism in each of the registers for the indicators therein, record-controlled means for determining the extent of movement imparted to the indicators by the said actuating mechanism, and means operated thereby for preventing the movement of the actuating mechanism in one or more of the registers.

29. In a tabulating apparatus, the combination with the indicators and actuating devices therefor, of a record, means controlled thereby for starting the actuating devices and means for completing the stroke or movement of the actuating devices independently of the actuator-starting means.

30. In a tabulating apparatus, the combination with the indicators and actuating devices therefor, of a shaft for imparting movement to the actuating devices, a record, means controlled thereby for operatively connecting said shaft with a motor to start the actuating devices, means controlled by the record for releasing the connection between said shaft and the motor from the control of the record and maintaining said connection independently of the record control, and means for releasing the shaft from connection with the motor upon the completion of one movement of the actuating devices.

31. In a tabulating apparatus, the combination of a record, a motor, the indicators and their actuating mechanism, a clutch adapted to connect the latter with the motor, a magnet controlling the clutch, record-controlled means for controlling the circuit through the magnet to start the indicator-actuating mechanism, and means actuated by the motor for shifting the control of the magnet to a circuit not controlled by the record, and means for releasing the connection between the motor and the indicator-actuating means and arresting the movement of the latter at the end of their prescribed movement.

32. The combination of the indicators and actuating devices, a clutch to connect the latter with a motor, a magnet controlling said clutch, a record-controlled means by which the circuit through the magnet is completed to operate the clutch and start the actuating devices, a switch operated by the motor to break said circuit and maintain a circuit through the magnet independently of the record-controlled means during the prescribed movement of the actuating devices, and means for actuating said switch to break the latter circuit upon the completion of said movement of the actuating devices.

33. The combination of an indicator, an actuator therefor adapted at each operation to impart a variable movement to the indicator, record-controlled means for determining the extent of movement to be imparted to the indicator at each operation of the actuator, a resetting device for the indicator, and means for preventing the movement of the actuator during the operation of the resetting device.

34. The combination of an indicator, a record, devices electrically controlled by the record for operating the indicator, a circuit-controlling device by which the circuit which controls the operation of the indicator is normally closed, a resetting device for the indicator, and means for operating said circuit-controller to open said circuit when the resetting device is being operated.

35. The combination of a plurality of indicators, a record, devices electrically controlled by the record for operating the indicators, a circuit-controlling device by which the circuit which controls the operation of the indicators is normally closed, a resetting device for the indicators, and means for operating said circuit-controlling device to open said circuit when the resetting device is being operated.

36. The combination of a plurality of indicators, record-controlled means for operating the indicators, carrying devices between the indicators, a resetting device for the indicators, and means actuated by the resetting device for locking the carrying devices while the indicators are being reset.

37. The combination of a plurality of registers having indicators therein, electrically-operated devices for actuating the indicators, a resetting device for each register, and means operated by any one of the resetting devices for breaking the circuit through all the registers.

38. The combination of a series of indicators, record-controlled means for actuating the indicators, a lever for each of said indicators, means operated by each indicator for releasing its lever when the indicator is moved beyond the maximum registry, means operated by said lever for engaging with the indicator next higher in the series, and means for actuating such lever to move the higher indicator one space after the indicator by which the lever has been released has been actuated by the record-controlled means.

39. The combination of a series of indicators, actuating mechanism therefor, record-controlled means for operating said mechanism to impart movement to the indicators by the one movement of the actuators, a lever for each of said indicators, means operated by each indicator for releasing its lever when the indicator is moved beyond its maximum registry, means operated by said lever for engaging with the indicator next higher in the series, and means for actuating the lever to move the higher indicator one space upon the return movement of the actuator.

40. The combination of a series of indicators, actuating mechanism therefor, a lever for each indicator, a latch arranged to hold the lever in its normal position, means carried by the indicator for releasing the lever from its latch, a pawl carried by the lever and arranged to engage with the indicator next higher in the series, cams arranged to engage with said levers after their latches have been released, means for operating the indicators by the movement of the actuating mechanism in one direction, and means for effecting on the opposite movement of the actuating mechanism the engagagement of said cams with the levers that have been released, to move forward one space the indicators with which the pawls of such levers are engaged.

41. The combination of a registering-indicator, a series of electromagnets controlling the movement of the indicator and a record-controlled circuit-closing device for each magnet.

42. The combination of a registering-indicator, a series of electromagnets and record-controlled means for energizing any one of said magnets to determine the extent of movement of the indicator at one operation.

43. The combination of a registering-indicator, a series of independently-connected electromagnets governing the movement of the indicator, a circuit-closing device for each magnet and a record for controlling the circuit-closing devices.

44. The combination of a registering-indicator, an actuator therefor, a series of electromagnets and record-controlled means for energizing any one magnet of the series to determine the extent of movement of the indicator.

45. The combination of a registering-indicator, an actuator therefor, a series of electromagnets and record-controlled means for operating the actuator and energizing any one magnet of the series to determine the extent of movement of the indicator.

46. The combination of an indicator, an actuator therefor, a series of electromagnets by which the point at which the actuator will engage the indicator is determined and record-controlled means by which the actuator is operated and the predetermined magnet of the series is energized to effect the engagement of the actuator and indicator.

47. The combination of an indicator, a movable actuator, devices arranged successively in the path of the actuator for controlling its engagement with the indicator, a series of electromagnets, each governing the action of one of said devices and record-controlled means for energizing a predetermined magnet of the series.

48. The combination of a plurality of registering-indicators, a series of electromagnets for controlling the movement of each indicator and a record-controlled circuit-closing device for each magnet.

49. The combination of a plurality of registering-indicators, a series of electromagnets for each of said indicators and record-controlled means for energizing any one of said magnets in each series to determine the extent of movement of one or more indicators at one operation.

50. The combination of a plurality of registering-indicators, a series of independently-connected electromagnets for each indicator governing the movement thereof, a circuit-closing device for each magnet, and a record controlling the circuit-closing devices.

51. The combination of a plurality of registering-indicators, actuating mechanism for each indicator, a series of electromagnets for each indicator and record-controlled means for energizing any one of the magnets of each series to determine the extent of movement of each indicator.

52. The combination of a plurality of indicators, actuating mechanism for each indicator, a series of electromagnets for each indicator and record-controlled means for operating the actuating mechanism and energizing any one of the magnets of each series to determine the extent of movement of the indicator.

53. The combination of a plurality of indicators, actuating mechanism for each indicator, a series of electromagnets for each indicator by which the point at which the actuating mechanism will engage the indicator is determined and record-controlled means by which the actuating mechanism is operated and the predetermined magnet in each series is energized to effect the engagement of the indicator and its actuating mechanism.

54. The combination of a plurality of indicators, movable actuating mechanism for the indicators, devices for each indicator arranged successively in the path of the actuating mechanism for controlling its engagement with its indicator, a series of electromagnets for each indicator, each magnet governing the action of one of said devices, and record-controlled means for energizing a predetermined magnet in each series.

55. The combination of a plurality of registering-indicators, actuating mechanism having a fixed range of movement, electromagnets controlling the engagement of the indicators and actuating mechanism, and means for establishing a circuit through said magnets at a predetermined point in the movement of the actuating mechanism to determine the extent of movement to be imparted to each indicator by each movement of its actuating mechanism.

56. The combination of a plurality of registering-indicators, actuating mechanism therefor having a fixed range of movement, electrically-actuated devices for controlling the engagement of each indicator with the actuating mechanism, and means for actuating the same to effect the control of each indicator at a predetermined point in the movement of the actuating mechanism.

57. The combination of a plurality of registering-indicators, actuating mechanism therefor, electromagnets controlling the engagement of the actuating mechanism and indicators, and means for establishing a circuit through the magnets for determining the extent of movement imparted to each indicator at each operation of the machine.

58. The combination of a plurality of indicators, actuating mechanism for the indicators, a pawl for each indicator carried by the actuating mechanism, a series of electromagnets for each indicator, a device controlled by each magnet for releasing one of the pawls to engage with its indicator, and record-controlled means for energizing any of the magnets of any series to release the pawl, carried by the actuating mechanism, for that series at a predetermined point in the movement of the latter.

59. The combination of a plurality of indicators, actuating mechanism therefor, a pawl carried by the latter, a series of electromagnets for each indicator, a tripping device controlled by each magnet for releasing one of the pawls to engage with its indicator, record-controlled means for energizing any one of the magnets of any series to release the pawl, carried by the actuating mechanism, for that series at a predetermined point in its movement, and means for resetting the tripping device.

60. The combination of a plurality of indicators, actuating mechanism for the indicators, a pawl for each indicator carried by the actuating mechanism, a series of electromagnets for each indicator, a tripping device controlled by each magnet for releasing one of the pawls to engage with its indicator, record-controlled means for energizing any one of the magnets of any series to release the pawl for that series at a predetermined point in its movement, means carried by the actuator for resetting the tripping device, and a detent for holding the tripping device when reset.

61. The combination of an electromagnet, an armature therefor, a pawl arranged to be released by the attraction of the armature, a detent for holding said pawl set and a cam actuated by the resetting of the pawl to carry the armature out of contact with the poles of the magnet.

62. The combination of an electromagnet, an armature therefor, a pawl arranged to be released by the attraction of the armature, means for resetting said pawl, a cam carried by the pawl and actuated by the resetting thereof to carry the armature out of contact with the poles of the magnet.

63. The combination of an indicator, a series of electromagnets for each indicator, record-controlled means for energizing any one magnet of the series to determine the extent of movement imparted to the indicator and a record-controlled selector governing the operation of the magnets.

HERMAN HOLLERITH.

Witnesses:
O. W. BRAITMAYER,
E. P. REA.